May 4, 1965   C. L. G. BENARD   3,182,287
LIGHT-BEACON AIRCRAFT GLIDE PATH
Filed Dec. 19, 1961   2 Sheets-Sheet 1

Inventor:
Christian Louis Georges Benard
By
Karl W. Flocks
Attorney

May 4, 1965

C. L. G. BENARD 3,182,287

LIGHT-BEACON AIRCRAFT GLIDE PATH

Filed Dec. 19, 1961

Inventor:
Christian Louis Georges Benard
By
Karl W. Flocks
Attorney

United States Patent Office 3,182,287
Patented May 4, 1965

3,182,287
LIGHT-BEACON AIRCRAFT GLIDE PATH
Christian Louis Georges Benard, Paris, France, assignor to Anciens Etablissements Barbier, Benard & Turenne, Paris, France, a company of France
Filed Dec. 19, 1961, Ser. No. 160,461
Claims priority, application France, Jan. 9, 1961, 849,205, Patent 1,044,738
4 Claims. (Cl. 340—26)

It has already been proposed to define the axes or planes on which ships or aircraft are compelled to move by means of light signals such that, when the navigator is located on the axis or plane to be followed, he sees a fixed light, and when he moves away from the said axis or plane, he sees a succession in time of flashes of light and dark intervals of different character, depending on whether he is on the right or on the left-hand side of the axis, a light flash on the right-hand side corresponding to a dark interval on the left-hand side, and vice versa.

Up to the present time, the devices used for producing a ground beacon lighting system of this kind consisted essentially of an optical device giving a beam of light concentrated in a horizontal plane and covering a given sector in this plane, at the maximum intensity. This optical system was caused to oscillate on each side of the axis to be beaconed through an angle less than or equal to the angle of the above-mentioned sector, providing different stopping times at the two extremities of the oscillation.

These systems have the disadvantage that in the case of long ranges necessitating optical devices of reasonable dimensions, the oscillation, which should be effected at a fairly high angular speed, gives rise to inertia forces which are not negligible and which adversely affect the accuracy of determination in space of the stopping positions on the right and left-hand sides of the axis.

The present invention has for its essential object to remedy these drawbacks, while making it possible to obtain, even with large optical devices, a greater accuracy in the definition of the axis or plane to be beaconed.

In the case of the guiding of an aircraft when coming down to land, the means employed make it possible to obtain great accuracy by virtue of the definition of a guiding or landing plane, fixed at a selected elevation, by the beams of two permanently-lighted optical devices having an angular amplitude in this plane of 10° to 20° by the spread of the beams.

Without departing from the scope of the invention, these means may comprise either a set of two lights, one fixed, the other intermittent of short duration, or an assembly of three lights, one of which is an auxiliary.

Other particular features and advantages of the present invention will become apparent from the description which follows below with reference to the accompanying drawings, and giving by way of explanation only and without any limitative sense, a form of embodiment of the apparatus.

Figure 1:
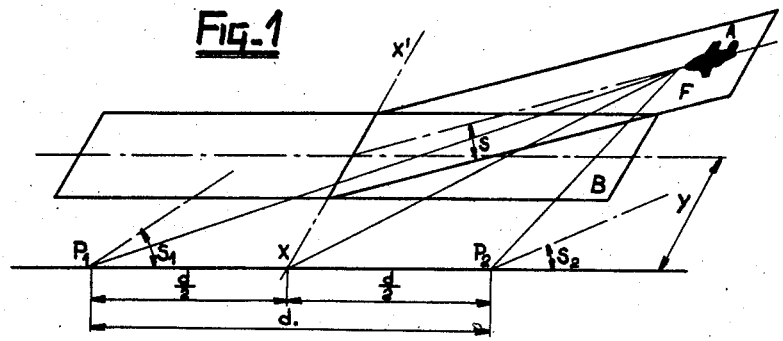
FIG. 1 is a diagrammatic description of the light with respect to the landing-strip and in isometric perspective.

In FIG. 1, there can be seen:

At A, the aircraft;
At B, the plane of the runway;
At F, the plane of descent;
At $P_1$, the rearward light, distant from the threshold of the runway;
At $P_2$, the forward light, close to the threshold of the runway, these two lights being as identical as possible from the photometric point of view, and arranged on a line parallel to the axis of the runway at a distance Y, their optical axes being parallel in azimuth to the axis of the runway;
At $d$, the distance separating $P_1$ from $P_2$;
At S, the angle of elevation of the plane of descent of the aircraft;
At XX', the line of interception of the planes of the runway and of descent;
At $S_1$ and $S_2$, the angles of elevation corresponding to the optical axes of the two fixed lights $P_1$ and $P_2$, $S_1$ being greater than S, and $S_2$ less than S.

The operation is as follows:

If D is the distance of utilization with the notations $d$ and S above, $e$ being the angle representing the separating power of the eye, the following relation:

$$d \sin S \geqslant eD$$

must be satisfied in order that the two lights are not merged with each other.

Figure 2:
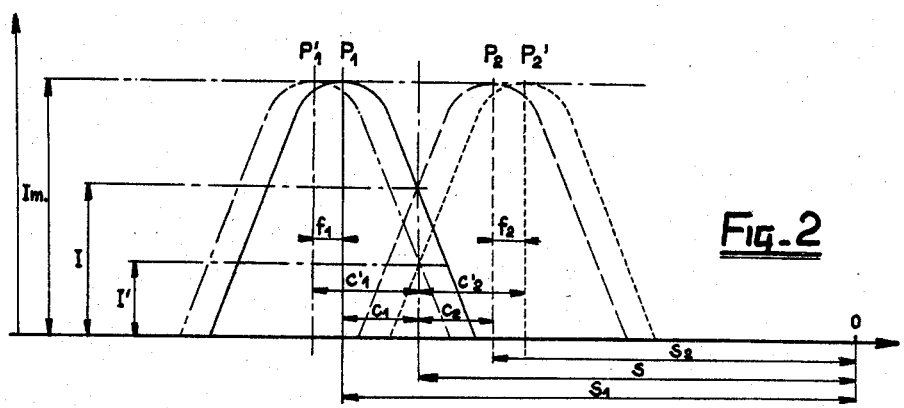
FIG. 2 shows the light intensities received from the two lights and their variation according to the position of the observer, especially when he is approaching.

In FIG. 2 there is shown the diagram which represents the light intensities (in ordinates) as a function of the various angles of elevation S, $S_1$ and $S_2$, and at O the horizontal.

The photometric curve for $P_1$ is shown in full lines and that for $P_2$ in broken lines.

From this figure, it can be seen that at the elevation S and for the distance D (practically infinite) the determining angles $S_1$ and $S_2$ of the optical axes of the two lights are fixed and that, in the direction of the elevation S, each of the two lights is seen with the same intensity.

There can also be seen from this figure the angles $C_1$ and $C_2$, the sides of which are the optical axes of these lights, and respectively the straight lines joining each of these lights to the eye of the observer. In particular, $C_1 = C_2$ when D is great.

The figure taken in a vertical plane thus defines an axis located in that plane. As the beams have been spread out in the horizontal plane, the isocandles having oval shapes intersect each other, in the case of isocandles of the same value at two points, all of which constitute the guiding plane which is thus the locus of the points in space from which the two main lights are seen with the same light intensity.

Figure 3:
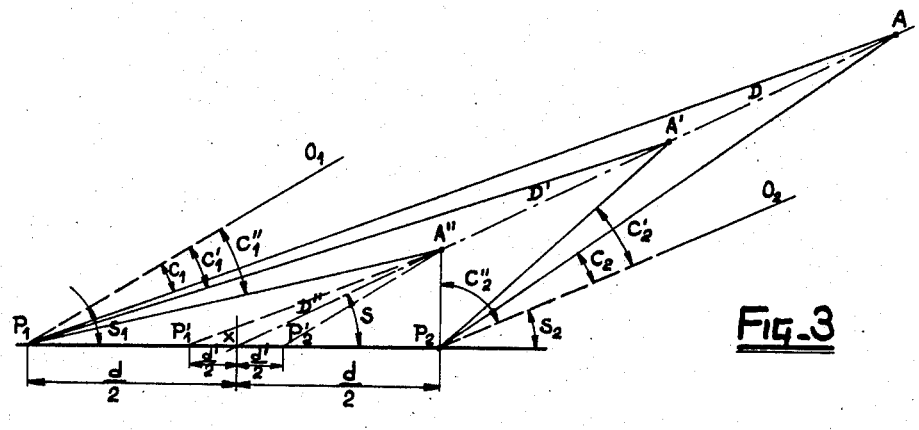
FIG. 3 represents the projection, on the vertical plane passing through the axis of the track, of the lights and of the aircraft, and indicating the various angles when the aircraft is coming down.

In FIG. 3, there are shown:

The successive positions of the aircraft at A, A' and A'';
The lights $P_1$, $P_2$ and their optical axes $O_1$ and $O_2$ having angles of elevation $S_1$, $S_2$;
The various angles $C_1$, $C_2$ and their modifications $C'_1$, $C''_1$, $C'_2$, $C''_2$, as a function of the positions A, A', and A'' of the aircraft.

Referring to FIGS. 2 and 3, the operation is as follows:
The aircraft being located at A, at a distance D which is assumed to be great, and on the axis of descent, the observer can see the two lights $P_1$ and $P_2$, equally brilliant with the same intensity I, D being comparable to infinity.

If A remains in the vicinity of the plane of descent, the observer will continue to see the two lights, but he will see the rearward light more brilliant than the forward light if he is above the plane of descent, and conversely. He will therefore by able to control the aircraft correspondingly.

If A is located above the plane of descent, the observer will clearly see the rearward light $P_1$, but not the forward light $P_2$ and conversely if A is located below the plane of descent.

As he sees only one light in either of these cases, the observer will not know if it is the rearward or the forward light. He would only be able to distinguish them if one of them is intermittent (very short periods of extinction of the light, which do not interfere with a practically continuous comparison of the brilliance of the two lights, but frequent enough to clearly distinguish this light from the other).

If the aircraft approaches to A', at a distance D' very much less than D, $C_1$ and $C_2$ assume the values $C'_1$ and $C'_2$ which both increase as the aircraft approaches, but which remain substantially equal as long as D' remains large compared with d.

In this case, FIG. 2 shows the displacement of the two photometric curves by the quantity $f_1$ to the left for $P_1$ (curve in chain-dotted lines) and by $f_2$ to the right for $P_2$ (curve in dotted lines).

These two equally displaced curves intersect on the axis of descent S at a value I' of the light intensity which is the same for both lights, I' being less than I. This reduction of I' is not a drawback since D' is less than D and the intensity of the threshold of visibility is greatly reduced.

When the aircraft reaches A" at a distance D" which is in the vicinity of d, the angles $C''_1$ and $C''_2$ no longer increase at an equal rate and $f''_2$ is greater than $f''_1$. The system then becomes inoperative, and at that moment the aircraft leaves the guiding and lands within sight.

Figure 4:
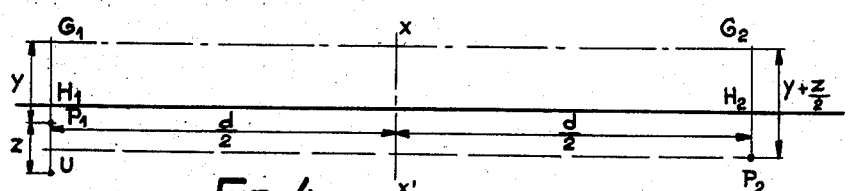
FIG. 4 shows an alternative arrangement utilizing, in addition to the two fixed lights, a third auxiliary light with the object of identifying positively the two fixed lights.

In FIG. 4 there is shown a device which enables the observer to avoid the ambiguity as to the direction of the operation to be carried out when he is outside the guiding plane and sees only a single light, when $P_1$ and $P_2$ are both fixed lights.

An auxiliary third light U is provided on the same line, perpendicular to the axis of the runway on the same line $G_1$ and $G_2$ as, for example, the rearward light $P_1$ on the side opposite to the said line, and at a distance Z from the latter light, equal to or greater than D$e$, so as to be distinguished from it by parallax.

This auxiliary light U is arranged so as to cover, at the same light intensities, the same fields as the light $P_1$, its optical axis being fixed at the elevation $S_1$.

The operation is as follows:

The pilot located above the plane of descent will see the two lights U and $P_1$ which will appear to him on a horizontal line perpendicular to the axis of the runway; he will therefore bring the plane down.

Conversely, if he only sees one light $P_2$, he will climb.

In order to unify the explanation of the operation of FIGS. 1 to 4, the auxiliary light U has been placed in FIG. 4 in the vicinity of the rearward light $P_1$. However, it can be placed in the vicinity of the forward light $P_2$, which is even preferable, since if one of the two lights $P_1$ or $P_2$ were extinguished by accident, the pilot is not thereby led into carrying out a manoeuvre which could be dangerous.

As soon as the pilot can see the three lights, he manoeuvres in elevation so as to equalize the illumination intensity of the two main lights $P_1$ and $P_2$.

The invention also provides the possibility of adding to the system of the two lights $P_1$, $P_2$, a second system $P'_1$, $P'_2$ (FIG. 3) at distances $d'/2$ from the point X and with a light intensity lower than that of the lights $P_1$, $P_2$, and which is used by the pilot when the first system $P_1$ and $P_2$ becomes inoperative at the end of the descent.

The device forming the object of the main feature of the invention can be combined with known devices, these combinations falling within the scope of the present invention.

While retaining the principle of the invention of the use of two main lights:

The sources and the optical devices may be of any type with a Fresnel lens or with a mirror;

In the case of two or three lights, the lamps may be conjointly supplied so that if one becomes extinguished by accident, the others are also extinguished, in order to avoid any false indication to the observer; this extinction may put into action an emergency system which may or may not be identical with the first;

Two identical systems with two or three lights can be combined on each side of the runway, the pilot using that which has the better visibility;

The auxiliary third light can be located either in the vicinity of the forward light or of the rearward light;

The photometric curves of the two main lights while being as nearly identical as possible, may differ slightly, the only condition being that the two beams are fixed in elevation so as to give the same intensity in the plane of descent selected;

In order to facilitate course-setting by the pilot, the main light can be arranged so that it corresponds to the auxiliary third light at a distance of $$Y + \frac{Z}{2}$$

from the axis of the runway. In this case, the three lights are arranged to form an isoceles triangle having a base Z and a height d, and the pilot manoeuvres so as to place himself parallel to the axis of the runway in order that the forward light $P_2$ is seen at an equal horizontal distance between the two rearward lights $P_1$ and U.

I claim:

1. A light-beacon device for facilitating the landing of aircraft on a runway along a pre-determined plane of descent, said device comprising two substantially identical main lights located close to said runway and having the axes of their beams fixed in angular elevation on each side of the angle of elevation of said plane of descent to be beaconed, each of said light beams being spread out in said plane giving equal intensities in each of the directions of said plane of descent, said main lights being spaced apart parallel to the axis of the runway by a distance such that at the extreme range of utilization they are angularly separate, whereby said predetermined plane of descent is the locus of the points in space at which the beams emitted by said main lights are visible at the same intensity and when said plane has an angle of descent slightly greater or less than said pre-determined plane of descent, one of said lights will appear to vary in brilliance and eventually disappear unless the angle of descent is corrected until the beams emitted by said main lights are again visible at the same intensity.

2. A light-beacon device as claimed in claim 1, and further comprising an auxiliary third light located in proximity to one of said main lights and covering substantially the same horizontal and vertical field as the main light to which it is in proximity, said auxiliary third light being spaced apart from the last-mentioned main light along a line perpendicular to the axis of the runway, whereby said auxiliary light can be clearly seen at the maximum distance of utilization of said device.

3. A light-beacon device as claimed in claim 2, in which said two main lights and said auxiliary third light are located at the apices of an isosceles triangle.

4. A light-beacon device as claimed in claim 1, in which one of said main lights is provided with an optical system giving a steady continuous beam, the other main light having an optical system giving rapid intermittent flashes of short duration, thereby removing possible ambiguity on the manoeuvre to be effected when the aircraft has an angular elevation greater or less than that of said plane of descent, and outside the vertical field covered by the optical system of one of said main lights at that distance.

References Cited by the Examiner
UNITED STATES PATENTS

| | | | |
|---|---|---|---|
| 2,597,321 | 5/52 | Hergerother | 340—26 |
| 2,756,407 | 7/56 | Toulmin | 340—26 |
| 3,012,224 | 12/61 | Ferguson | 340—26 |

NEIL C. READ, *Primary Examiner.*
THOMAS B. HABECKER, *Examiner.*